United States Patent
Abou Mahmoud et al.

(10) Patent No.: US 10,891,419 B2
(45) Date of Patent: Jan. 12, 2021

(54) DISPLAYING ELECTRONIC TEXT-BASED MESSAGES ACCORDING TO THEIR TYPOGRAPHIC FEATURES

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 15/795,345

(22) Filed: Oct. 27, 2017

(65) Prior Publication Data

US 2019/0129924 A1   May 2, 2019

(51) Int. Cl.
| | | |
|---|---|---|
| G06F 15/16 | (2006.01) | |
| G06F 40/109 | (2020.01) | |
| H04L 12/58 | (2006.01) | |

(52) U.S. Cl.
CPC ............ *G06F 40/109* (2020.01); *H04L 51/10* (2013.01); *H04L 51/22* (2013.01); *H04L 51/26* (2013.01); *H04L 51/32* (2013.01); *H04L 51/36* (2013.01)

(58) Field of Classification Search
CPC ......... H04L 51/12; H04L 51/10; H04L 51/32; H04L 51/26; H04L 51/22; H04L 51/36; G06Q 10/107; G06F 40/109
See application file for complete search history.

(56) References Cited

U.S. PATENT DOCUMENTS

| | | | |
|---|---|---|---|
| 7,304,985 B2 | 12/2007 | Sojka et al. | |
| 7,676,745 B2 | 3/2010 | Egnor | |
| 8,150,930 B2 * | 4/2012 | Satterfield | ............ G06F 3/0481 |
| | | | 709/206 |

(Continued)

FOREIGN PATENT DOCUMENTS

GB        2401225 A       3/2004

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Oleg Survillo
(74) *Attorney, Agent, or Firm* — James W. Kappos

(57) ABSTRACT

A computer-implemented method improves an efficiency of a client computer's electronic text-based messaging operation. A client computer transmits a user-selected set of preferred typographic features to a text-based electronic messages server, where typographic features describe a stylistic appearance of an electronic text-based message. The client computer also transmits, to the text-based electronic messages server, instructions to sort text-based electronic messages that are addressed to the client computer according to the user-selected set of preferred typographic features. The client computer receives text-based messages that have been sorted by the text-based electronic messages server according to the user-selected set of preferred typographic features, and then displays those text-based messages in an order according to how the text-based electronic messages server sorted the text-based electronic messages.

20 Claims, 6 Drawing Sheets

MESSAGE 1          MESSAGE 2          MESSAGE 3

(56) References Cited

U.S. PATENT DOCUMENTS

| | | | |
|---|---|---|---|
| 8,428,228 B1 | 4/2013 | Baster, Jr. | |
| 8,510,260 B2 | 8/2013 | Deluca et al. | |
| 8,832,205 B2 | 9/2014 | Nelson et al. | |
| 10,423,696 B2 * | 9/2019 | Bishop | G06F 16/168 |
| 2003/0233418 A1 * | 12/2003 | Goldman | G06Q 10/107 |
| | | | 709/206 |
| 2004/0006742 A1 | 1/2004 | Slocombe | |
| 2004/0073617 A1 * | 4/2004 | Milliken | G06F 21/562 |
| | | | 709/206 |
| 2004/0210639 A1 * | 10/2004 | Ben-Yoseph | H04L 51/043 |
| | | | 709/206 |
| 2005/0028077 A1 | 2/2005 | Wen et al. | |
| 2005/0050150 A1 * | 3/2005 | Dinkin | H04L 51/12 |
| | | | 709/207 |
| 2007/0112748 A1 | 5/2007 | Angell et al. | |
| 2007/0133034 A1 * | 6/2007 | Jindal | G06F 16/9535 |
| | | | 358/1.14 |
| 2009/0013052 A1 * | 1/2009 | Robarts | G06Q 10/107 |
| | | | 709/206 |
| 2010/0082645 A1 * | 4/2010 | Grigsby | G06Q 10/107 |
| | | | 707/752 |
| 2010/0332518 A1 * | 12/2010 | Song | G06F 3/0483 |
| | | | 707/769 |
| 2012/0198017 A1 * | 8/2012 | LeVasseur | H04L 63/168 |
| | | | 709/206 |
| 2012/0246725 A1 * | 9/2012 | Osipkov | G06F 21/572 |
| | | | 726/23 |
| 2013/0238728 A1 | 9/2013 | Fleck et al. | |
| 2014/0019568 A1 * | 1/2014 | Yu | H04L 51/12 |
| | | | 709/206 |
| 2015/0100527 A1 | 4/2015 | Ryan | |
| 2015/0269125 A1 * | 9/2015 | Desai | G06F 17/212 |
| | | | 715/752 |
| 2016/0105387 A1 * | 4/2016 | Jackson | H04W 4/21 |
| | | | 709/206 |
| 2016/0314066 A1 * | 10/2016 | Mirza | G06F 11/3692 |
| 2017/0134329 A1 * | 5/2017 | Edgar | H04L 51/26 |
| 2017/0142049 A1 * | 5/2017 | Ganin | H04L 51/12 |
| 2018/0375807 A1 * | 12/2018 | Krans | H04L 51/046 |

OTHER PUBLICATIONS

Cai et al., "VIPS: A Vision-Based Page Segmentation Algorithm". Microsoft Research, Technical Support, MSR-TR-2003-79, Nov. 1, 2003, pp. 1-29.

Omid Bonakdar Sakhi, "Segmentation of Heterogeneous Document Images: An Approach Based on Machine Learning, Connected Components Analysis, and Texture Analysis". Universite Paris-Est, 2012. English. <NNT : 2012PEST1063>. <tel-00912566>.

* cited by examiner

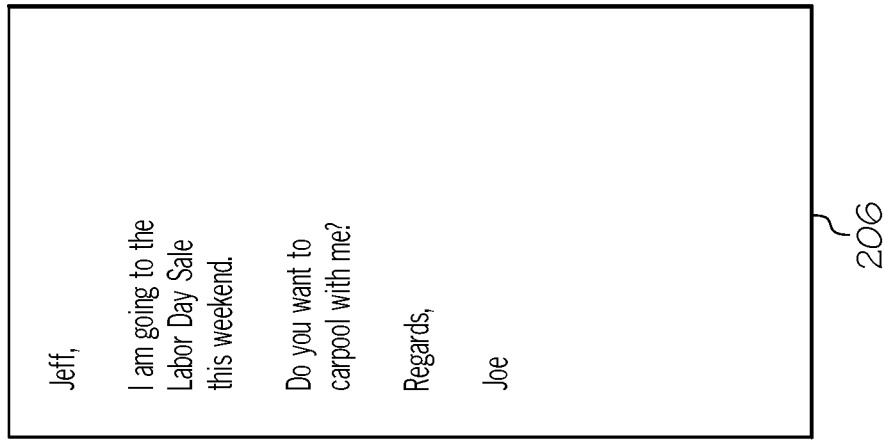
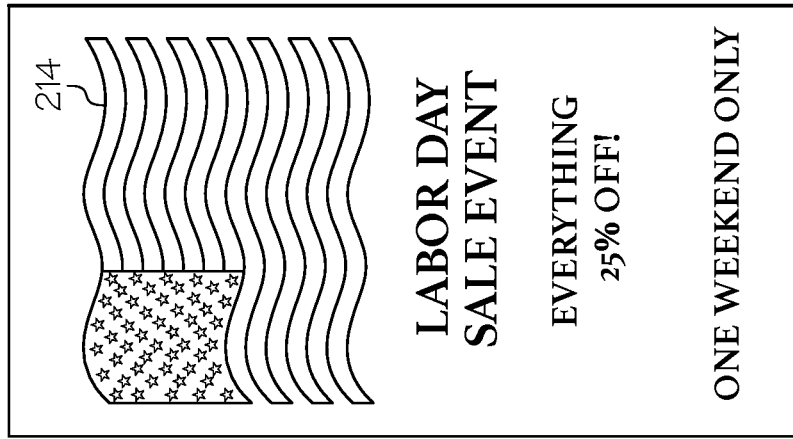
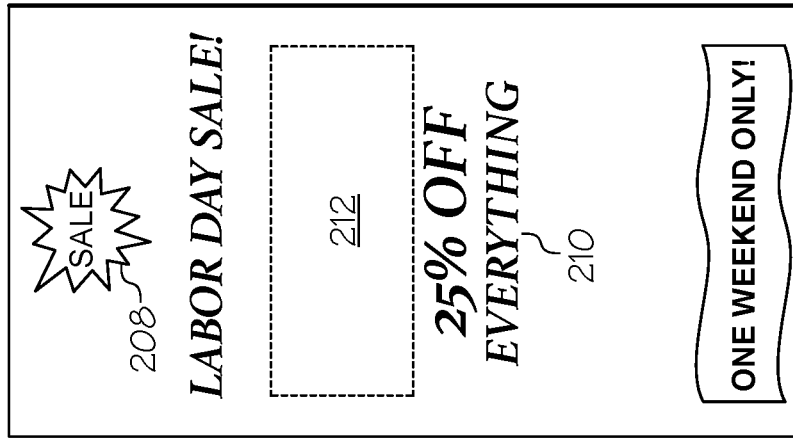
FIG. 2

DISPLAYING ELECTRONIC TEXT-BASED MESSAGES ACCORDING TO THEIR TYPOGRAPHIC FEATURES

BACKGROUND

The present invention relates to the field of computers, and particularly to computers that receive electronic messages. Still more particularly, the present invention relates to sorting electronic messages according to their typographic features.

SUMMARY

In one or more embodiments of the present invention, a computer-implemented method improves an efficiency of a client computer's electronic text-based messaging operation. A client computer transmits a user-selected set of preferred typographic features to a text-based electronic messages server, where typographic features describe a stylistic appearance of an electronic text-based message. The client computer also transmits, to the text-based electronic messages server, instructions to sort text-based electronic messages that are addressed to the client computer according to the user-selected set of preferred typographic features. The client computer receives text-based messages that have been sorted by the text-based electronic messages server according to the user-selected set of preferred typographic features, and then displays those text-based messages in an order according to how the text-based electronic messages server sorted the text-based electronic messages.

The described invention may also be implemented in a computer system and/or as a computer program product.

BRIEF DESCRIPTION OF THE DRAWINGS

FIG. 2 illustrates exemplary electronic messages that are addressed to a user;

DETAILED DESCRIPTION

Figure 1:
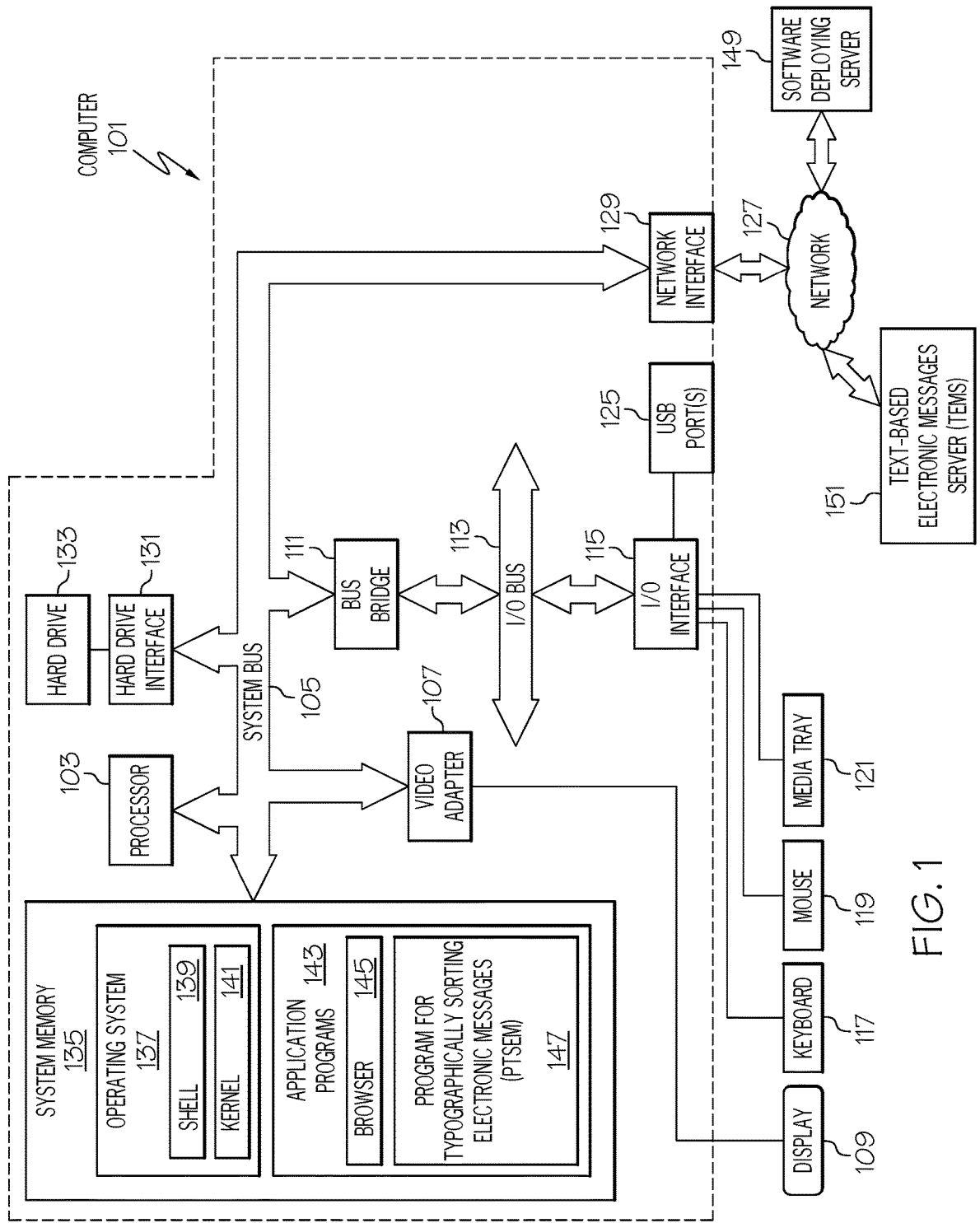
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Online Social Networks are the universal mechanism to connect people and information in logical and organized ways which enable sharing and processing of information between the users. The most common mechanisms of sharing and processing of information is the inbox, wall, activity stream, timeline, or profile.

Users receive hundreds, if not thousands, of digital communications on a daily-basis. Emails, social network posts and tweets are just a few examples of such digital communications. With this massive amount of information, it is hard to pick which ones to read and focus on and it is even harder for a user to find and read things that the user believes are important. This problem goes beyond the quantity of communications. The size of these communications is also an issue.

If a user knows which specific digital communications he wishes to receive, such as from known persons (i.e., those in his/her contact list) or about known topics (e.g., based on data mining of subject lines or message content), then the user can simply screen/filter/block incoming digital communications. However, the user often does not know which particular senders or topics or content will be of interest to him/her. Therefore, the user can decide (using the present invention) which digital communications are presented/ranked based on their stylistic appearance, known as their "typography features".

That is, in the present invention the term "typography features" is defined as a stylistic appearance based on the font, color, and size of text in the digital communications, and/or the presence or absence of blank blocks of spacing, photographs, graphic designs, and other types of non-textual content in the digital communication.

The term "text-based electronic messages" is defined as digital communications that communicate text (i.e., words), but may or may not be augmented with spacing, photographs, graphic designs, and other types of non-textual content in the digital communication.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a Text-based Electronic Messages Server (TEMS) 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143.

Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Typographically Sorting Electronic Messages (PTSEM) 147. PTSEM 147 includes code for implementing the processes described below, including those described in FIGS. 2-4. In one embodiment, computer 101 is able to download PTSEM 147 from software deploying server 149, including in an on-demand basis, wherein the code in PTSEM 147 is not downloaded until needed for execution. In one embodiment of the present invention, software deploying server 149 performs all of the functions associated with the present invention (including execution of PTSEM 147), thus freeing computer 101 from having to use its own internal computing resources to execute PTSEM 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As stated above, the present invention pre-sorts digital communications based on their typographical appearance. For example, consider the digital communications shown in FIG. 2 that are addressed to a particular user (e.g., a user of computer 101 shown in FIG. 1).

Message 1 (identified in the figure as message 202) is an advertisement for a Labor Day Sale. Included in the advertisement are typical typographic features, such as the graphic design 208 shown with offset text over a "splash" of color (such as red), the large, bold, and underlined text in text 210, as well as the blank space 212 in the middle of the Message 1.

Message 2 (identified in the figure as message 204) is also an announcement about the Labor Day Sale, and includes a graphic drawing 214 showing a flag.

Message 3 (identified in the figure as message 206) is a text message (i.e., an e-mail, a Short Message Service (SMS) text message, etc.) to user "Jeff" from "Joe".

As shown, all messages contain the phrase "Labor Day Sale". Therefore, screening or sorting them according to their textual content is not possible. However, they each use distinct typographies. That is, Message 1 includes highly stylized graphics and a large blank space in the middle, and Message 2 includes a drawing. Message 3, however, includes no such features, but rather only has text in a standard font, size, and color.

As such, the user may prefer to show messages that "look like" Message 3 (i.e., only have text without large spacing, drawings, graphics such as shown in Messages 1-2). That is, the user may prefer to have messages that do not look like Message 3 blocked by a messaging server, or at least have the messaging server sort and display new messages such that those that look like Message 3 are listed at a top of a message listing in an inbox. This preference assumes that the user is not interested in any digital communication other than those that use standard text to communicate without any embellishments.

Alternatively, the user may prefer to put messages that "look like" Messages 1-2 at the top of a list of messages. For example, such messages may be emergency alerts (e.g., weather alerts about eminent tornado activity), which the user may wish to be shown at the top of his/her inbox.

Figure 3:
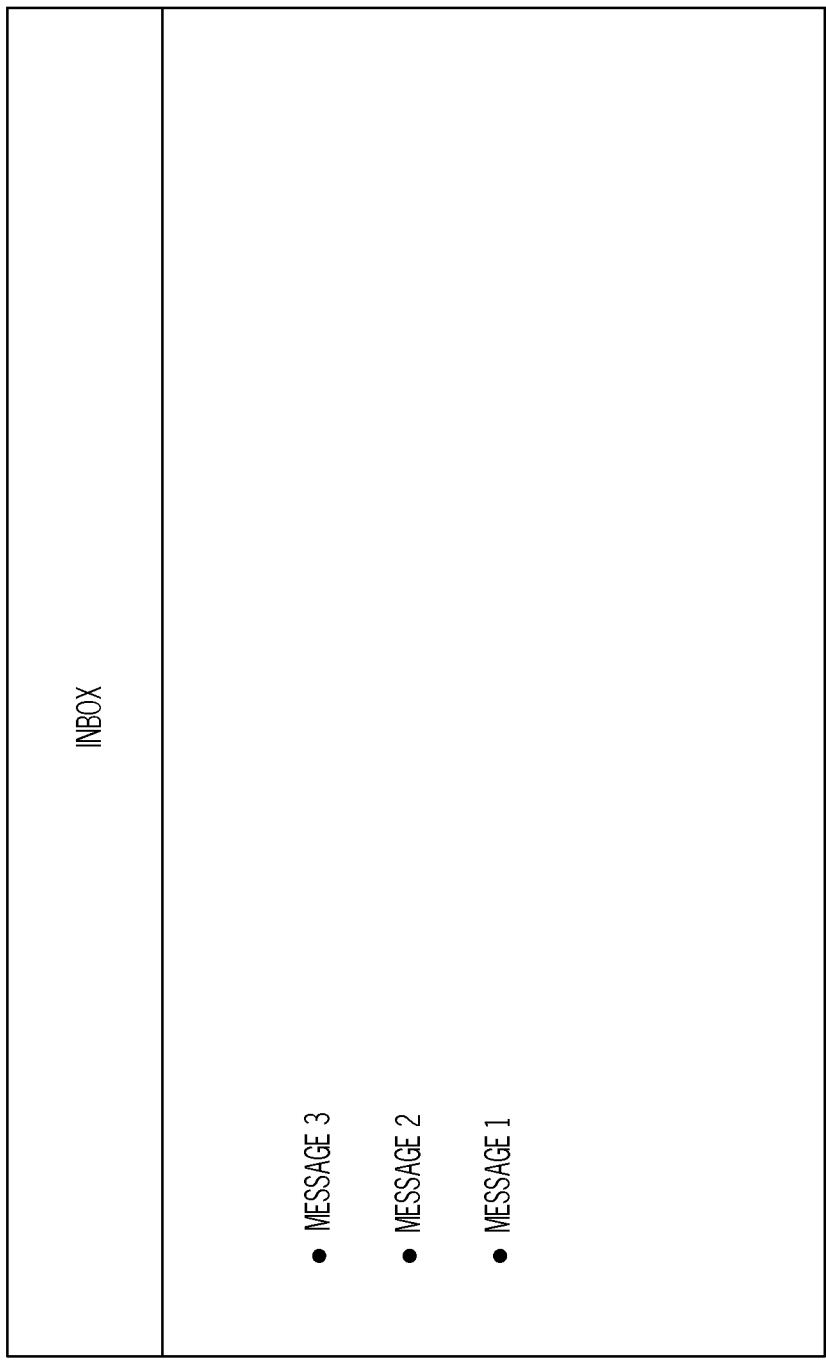
FIG. 3 depicts a sorted listing of the electronic messages being displayed to the user according to one or more embodiments of the present invention.

Assuming, however, that the user wishes to show messages that "look like" Message 3 at the top of his/her inbox, then his/her inbox will look like inbox 301 shown in FIG. 3. In an alternative embodiment, Messages 1-2 may be blocked and would not appear in the inbox 301 at all.

One embodiment of the present invention allows the user to view and select a preferred style of message from multiple messages, which may be actual messages that are addressed to the user or may be model messages. That is, assume that the Text-based Electronic Messages Server (TEMS) 151 shown in FIG. 1 has Messages 1-3, which may be real messages that are addressed to the user of computer 101 or may be model messages that are generated by TEMS 151. As such, Messages 1-3 may be sent from TEMS 151 to computer 101 with instructions to the user of computer 101 to select which types (i.e., typographical types) of messages he/she wishes to receive and/or place at the top of his/her inbox. In the example shown in FIG. 3, the user has elected to 1) receive all three types of messages shown as Messages 1-3, and to 2) place those that look like Message 3 at the top of his/her inbox.

If the user has chosen Message 1 or Message 2 as the preferred type of message to be received and/or placed at the top of his/her inbox, then Message 1 and/or Message 2 would be placed at the top of his/her inbox.

Thereafter, when any new messages that are addressed to the user of computer 101 are received by TEMS 151, TEMS 151 will filter and/or block and/or sort them according to the user's preferences. For example, if the user has indicated (i.e., in instructions from computer 101 to TEMS 151) that the user prefers to receive all digital communications that are addressed to the user, and that the user prefers to have these digital communications sorted such that messages that look like Message 1 are shown at the top of the inbox, then TEMS 151 will sort new incoming messages accordingly before sending them to computer 101. This pre-sorting of messages (before they arrive at the computer 101) improves the operation of the computer 101 since it allows the user of computer 101 to generate his/her personal preferences, which are then implemented by TEMS 151, thus leading to a local messaging system that is tailored to the needs of the user, reduces the processing requirements of computer 101, and (if used to block messages) limits bandwidth consumption between TEMS 105 and computer 101 as well as reduces the usage of resources (e.g., memory) used by computer 101. TEMS 151 is also able to implement preferences of other users using other client computers. As such, a robust system is generated that allows clients/users to have customized and more efficient messaging systems by using local control over the remote TEMS 151.

In an alternate embodiment, the present invention allows the user to simply input (e.g., from a webpage sent by TEMS 151) the preferred appearance features to use when sorting and/or blocking new incoming messages. That is, such a webpage may simply be a listing of features that can be checked by the user (e.g., "Drawings", "Large blank sections", etc.), the presence or absence of which are used to sort and/or block the new incoming messages.

Figure 4:
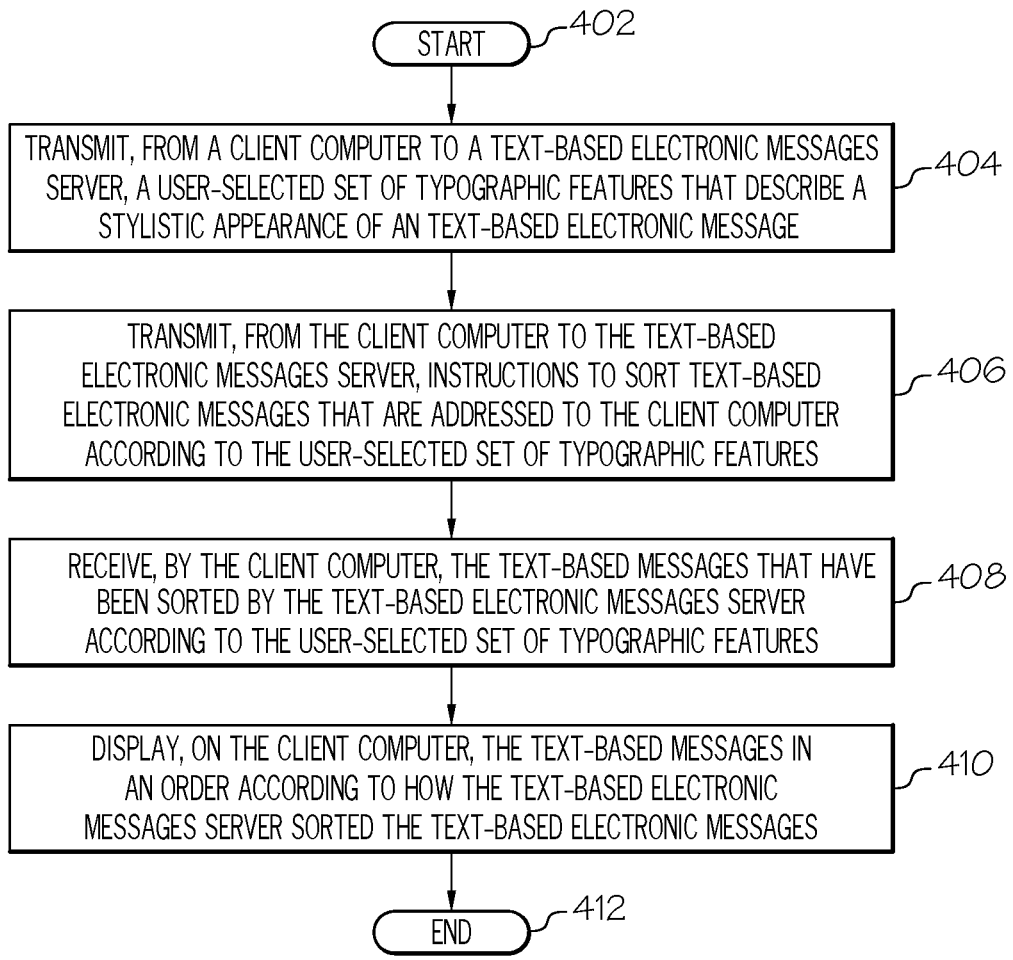
FIG. 4 is a high-level flow chart of one or more steps performed by one or more processors and/or other hardware devices to improve electronic messaging in accordance with one or more embodiments of the present invention.

With reference now to FIG. 4, a high-level flow chart of one or more steps performed by one or more processors and/or other hardware devices to improve a client computer's electronic text-based messaging operation in accordance with one or more embodiments of the present invention is presented.

After initiator block 402, a client computer (e.g., computer 101 shown in FIG. 1) transmits, to a text-based electronic messages server (e.g., TEMS 151 shown in FIG. 1), a user-selected set of preferred typographic features, as described in block 404. As described herein, typographic features describe a stylistic appearance of an electronic text-based message, and are independent of (indifferent to) the words themselves and their meanings/definitions.

As described in block 406, the client computer transmits, to the text-based electronic messages server, instructions to sort text-based electronic messages that are addressed to the client computer according to the user-selected set of preferred typographic features. In one embodiment of the present invention, this sorting sorts of all of the text-based electronic messages. In another embodiment of the present invention, this sorting blocks certain text-based electronic messages, even though they are addressed to the user. In yet another embodiment of the present invention, this sorting first blocks (i.e., filters out) some of the text-based electronic messages that are addressed to the user, and then sorts (according to secondary typographic preferences presented by the user) the remaining text-based electronic messages that are addressed to the user.

As described in block 408, the client computer receives text-based messages that have been sorted by the text-based electronic messages server according to the user-selected set of preferred typographic features (see FIG. 3), and then displays the text-based messages in an order according to how the text-based electronic messages server sorted the text-based electronic messages (block 410).

The flow-chart ends at terminator block 412.

In an embodiment of the present invention, the text-based electronic messages server sorts the text-based electronic messages by performing the following actions. First, the text-based electronic messages server receives the text-based electronic messages from a social networking environment, such as a social network, an email network, etc. The text-based electronic messages server then analyzes, by using a structural analysis technique, the text-based electronic messages in order to identify typographic features of the text-based electronic messages. This structural analysis technique uses image recognition techniques known to those skilled in the art of digital communications to recognize certain fonts, large blank spaces, graphics, drawings, photographs, etc. that may or may not be in the digital communications. The text-based electronic messages server then identifies, based on this analysis (the analyzing), a subset of the text-based electronic messages that have similar typographic features (e.g., all text-based electronic messages that are devoid of any content except for text that uses a user-selected font style). The text-based electronic messages server then provides the subset of the text-based electronic messages to the client computer as a group in order to indicate the similar typographic features of the subset of the text-based electronic messages. That is, the text-based electronic messages server has pre-sorted the subset of text-based electronic messages, which are then presented to the client computer as a group.

In an embodiment of the present invention, the social networking environment just described is from a group consisting of instant messaging (IM), short message services (SMS), a wiki, a social networking service, a newsfeed, and email.

In an embodiment of the present invention, the typography features include at least one feature from a group of text features consisting of a font type, a font color, and a font size.

In an embodiment of the present invention, the typography features include a presence of a photograph within the text-based electronic messages.

In an embodiment of the present invention, the typography features include an absence of a photograph within the text-based electronic messages.

In an embodiment of the present invention, the text-based messages are emails.

Thus, as described herein, the present invention provides a new and useful technology-based improvement of a user's digital communications operations. An exemplary use case of one or more embodiments of the present invention is as follows.

First, the user logs on to his email client (e.g., an email application, which may be part of PTSEM 147, that is running on computer 101 shown in FIG. 1).

Next, the TEMS 151 scans and analyzes the content of the user's email.

The TEMS 151 categorizes the emails based on the forms of the content construction by utilizing the techniques described herein, such as document segmentation based on visual gaps, vision-based document segmentation, and document structure identification.

The TEMS 151 can also group the emails (or other forms of digital communications such as postings on a social media webpage, text messages, etc.) based on their typographical features. Thus, the emails are not sorted by senders or content, but rather by their typographical appearance.

In an embodiment of the present invention, the TEMS 151 generates a visual model for the emails based on the similarity of the content forms. That is, by taking the user-input selecting a particular message (see FIG. 2) or user-input that manually selects desired features (e.g., by checking boxes of feature descriptions from a webpage), TEMS 151 is able to generate a paradigm of digital communications that the user wants to receive and/or have displayed at the top of a listing of digital communications (e.g., an inbox). As such, TEMS 151 assigns ranks to the emails based on the similarity of the content forms, and sends them to the client computer 101 to be displayed in the user's message inbox based on the ranking of the content forms (by displaying the emails that have the most similar form on the top). This will allow the user to pay more attention to those emails as they may require more time for the user to process them.

In an alternative embodiment, TEMS 151 displays emails that have the least similarity at the top of the user's message inbox. This allows anomalous emails (i.e., emergency messages that have typographic styles with which the user is not familiar) to be highlighted to the user by being placed at the top of the user's message inbox.

However, in a preferred embodiment, TEMS 151 directs the user's computer 101 to display messages that share similar user-preferred typographic styles at the top of the user's message inbox, so the user can quickly go through them first depending on the user's preferences, as shown in FIG. 3.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
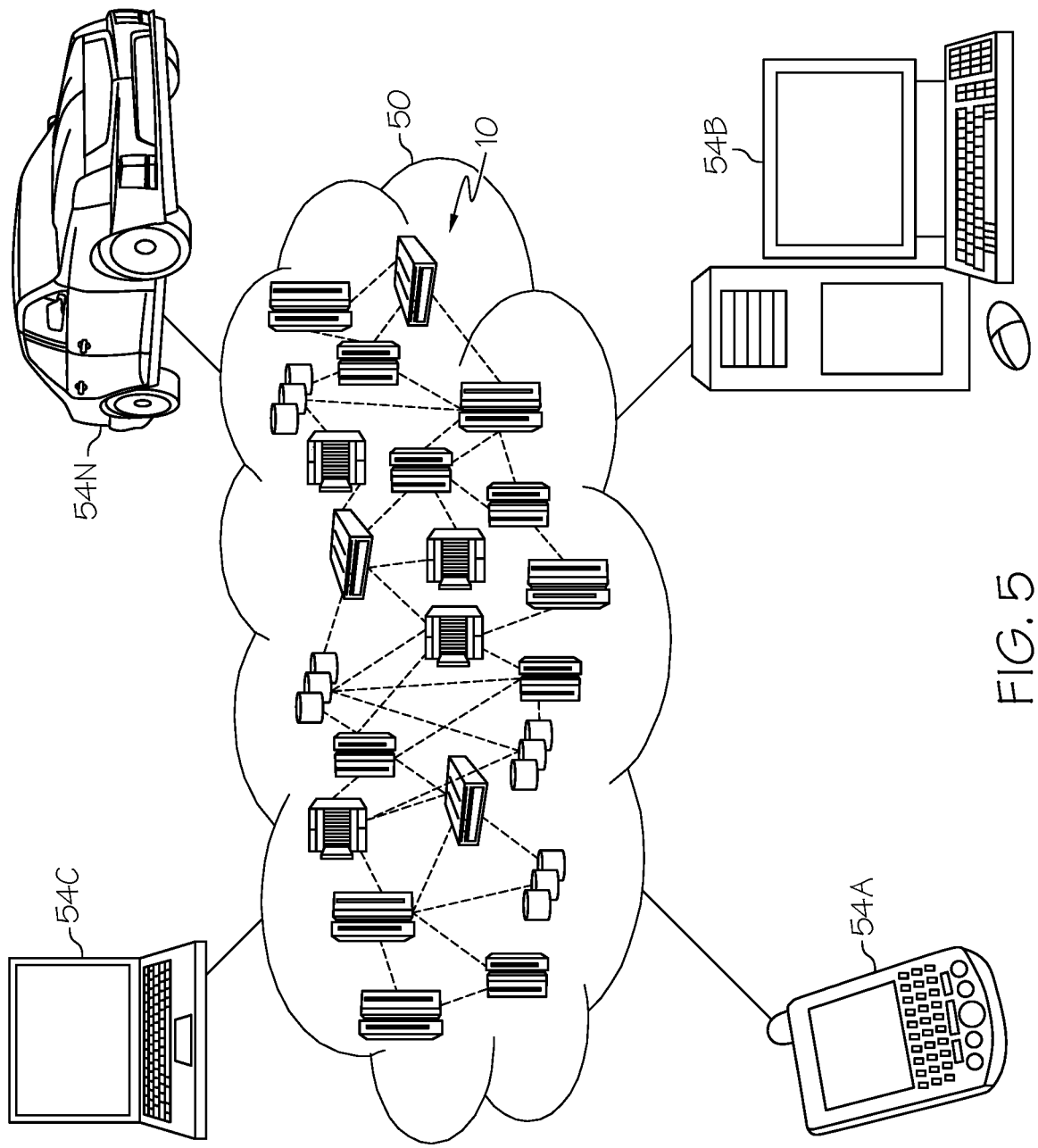
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
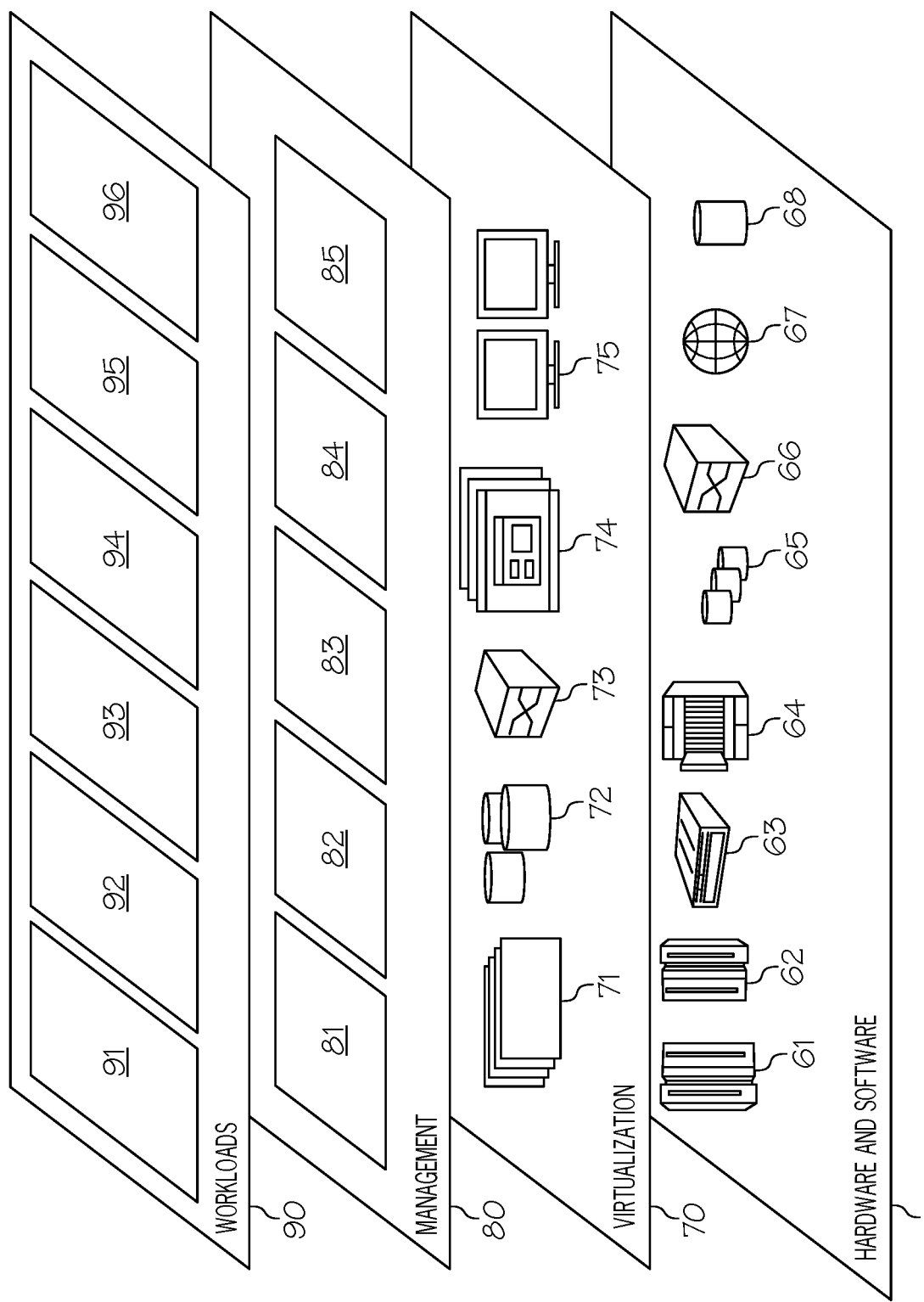
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic message processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for improving a client computer's electronic text-based messaging operation, the computer-implemented method comprising:
   transmitting, from a client computer to a text-based electronic messages server, a user-selected set of preferred typographic features, wherein the typographic features describe a stylistic appearance of a text-based electronic message and include all of the features from the group consisting of a presence of text of at least two colors, a presence of text of at least two sizes, a presence of bold text, a presence of underlined text, and a presence of a graphic design;
   transmitting, from the client computer to the text-based electronic messages server, instructions to group into subsets, and to sort text-based electronic messages that are addressed to the client computer according to the user-selected set of preferred typographic features;
   receiving, by the client computer, the text-based electronic messages that have been sorted by the text-based electronic messages server according to the user-selected set of preferred typographic features; and
   displaying, on the client computer, the text-based electronic messages in an order according to how the text-based electronic messages server sorted the text-based electronic messages.

2. The computer-implemented method of claim 1, wherein the text-based electronic messages server sorts the text-based electronic messages by:
   receiving the text-based electronic messages from a social networking environment;
   analyzing, using a structural analysis technique, the text-based electronic messages in order to identify typographic features of the text-based electronic messages;
   identifying, based on the analyzing, a subset of the text-based electronic messages that have similar typographic features; and providing the subset of the text-based electronic messages to the client computer as a group in order to indicate the similar typographic features of the subset of the text-based electronic messages.

3. The computer-implemented method of claim 2, wherein the social networking environment is from a group consisting of instant messaging (IM), short message services (SMS), a wiki, a social networking service, a newsfeed, and email.

4. The computer-implemented method of claim 1, wherein the typographic features include at least one feature from a group of text features consisting of a font type, a font color, and a font size.

5. The computer-implemented method of claim 1, wherein the typographic features include a presence of a photograph within the text-based electronic messages.

6. The computer-implemented method of claim 1, wherein the typographic features include an absence of a photograph within the text-based electronic messages.

7. The computer-implemented method of claim 1, wherein the text-based messages are emails.

8. A computer program product for improving a client computer's electronic text-based messaging operation, the computer program product comprising a non-transitory computer readable storage device having program instructions embodied therewith, the program instructions readable and executable by a computer to perform a method comprising:
    transmitting, from a client computer to a text-based electronic messages server, a user-selected set of preferred typographic features, wherein the typographic features describe a stylistic appearance of a text-based electronic message and include all of the features from the group consisting of a presence of text of at least two colors, a presence of text of at least two sizes, a presence of bold text, a presence of underlined text, and a presence of a graphic design;
    transmitting, from the client computer to the text-based electronic messages server, instructions to group into subsets, and to sort text-based electronic messages that are addressed to the client computer according to the user-selected set of preferred typographic features;
    receiving, by the client computer, the text-based electronic messages that have been sorted by the text-based electronic messages server according to the user-selected set of preferred typographic features; and
    displaying, on the client computer, the text-based electronic messages in an order according to how the text-based electronic messages server sorted the text-based electronic messages.

9. The computer program product of claim 8, wherein the text-based electronic messages server sorts the text-based electronic messages by:
    receiving the text-based electronic messages from a social networking environment;
    analyzing, using a structural analysis technique, the text-based electronic messages in order to identify typographic features of the text-based electronic messages;
    identifying, based on the analyzing, a subset of the text-based electronic messages that have similar typographic features; and
    providing the subset of the text-based electronic messages to the client computer as a group in order to indicate the similar typographic features of the subset of the text-based electronic messages.

10. The computer program product of claim 9, wherein the social networking environment is from a group consisting of instant messaging (IM), short message services (SMS), a wiki, a social networking service, a newsfeed, and email.

11. The computer program product of claim 8, wherein the typographic features include at least one feature from a group of text features consisting of a font type, a font color, and a font size.

12. The computer program product of claim 8, wherein the typographic features include a presence of a photograph within the text-based electronic messages.

13. The computer program product of claim 8, wherein the typographic features include an absence of a photograph within the text-based electronic messages.

14. The computer program product of claim 8, wherein the text-based messages are emails.

15. The computer program product of claim 8, wherein the program instructions are provided as a service in a cloud environment.

16. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
    program instructions to transmit, from a client computer to a text-based electronic messages server, a user-selected set of preferred typographic features, wherein the typographic features describe a stylistic appearance of a text-based electronic message and include all of the features from the group consisting of a presence of text of at least two colors, a presence of text of at least two sizes, a presence of bold text, a presence of underlined text, and a presence of a graphic design;
    program instructions to transmit, from the client computer to the text-based electronic messages server, instructions to group into subsets, and to sort text-based electronic messages that are addressed to the client computer according to the user-selected set of preferred typographic features;
    program instructions to receive, by the client computer, the text-based electronic messages that have been sorted by the text-based electronic messages server according to the user-selected set of preferred typographic features; and
    program instructions to display, on the client computer, the text-based electronic messages in an order according to how the text-based electronic messages server sorted the text-based electronic messages.

17. The computer system of claim 16, wherein the text-based electronic messages server sorts the text-based electronic messages by:
    receiving the text-based electronic messages from a social networking environment;
    analyzing, using a structural analysis technique, the text-based electronic messages in order to identify typographic features of the text-based electronic messages;
    identifying, based on the analyzing, a subset of the text-based electronic messages that have similar typographic features; and
    providing the subset of the text-based electronic messages to the client computer as a group in order to indicate the similar typographic features of the subset of the text-based electronic messages.

18. The computer system of claim 17, wherein the social networking environment is from a group consisting of instant messaging (IM), short message services (SMS), a wiki, a social networking service, a newsfeed, and email.

19. The computer system of claim 16, wherein the text-based messages are emails.

20. The computer system of claim 16, wherein the program instructions are provided as a service in a cloud environment.

* * * * *